Jan. 15, 1952     C. T. PAMP, JR     2,582,272
FILTER PACK

Filed Sept. 20, 1947     3 Sheets-Sheet 1

INVENTOR
CLARENCE T. PAMP, JR.

BY
J. William Carson
ATTORNEY

Jan. 15, 1952     C. T. PAMP, JR     2,582,272
FILTER PACK

Filed Sept. 20, 1947     3 Sheets-Sheet 2

INVENTOR
CLARENCE T. PAMP, JR.

BY
J. William Carson
ATTORNEY

Patented Jan. 15, 1952

2,582,272

UNITED STATES PATENT OFFICE 2,582,272

FILTER PACK

Clarence T. Pamp, Jr., Shanks Village, N. Y., assignor, by mesne assignments, to Specialties Development Corporation, Belleville, N. J., a corporation of New Jersey Application September 20, 1947, Serial No. 775,223

8 Claims. (Cl. 210—169)

The present invention relates to apparatus for filtering liquids, and more particularly relates to an improved filter pack or unit of the edge type for filtering engine oil or the like.

An object of the invention is to provide an improved edge type filter pack having a greater rate of filtration than filter packs of the same size used heretofore.

Another object is to provide a filter pack having discs formed to present a maximum filter edge length for a disc of a given area.

A further object is to provide a filter pack of the foregoing described character wherein the liquid to be filtered has easy access to the filter edges and the filtered liquid is readily collected and discharged from the pack.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein.

Figure 1:
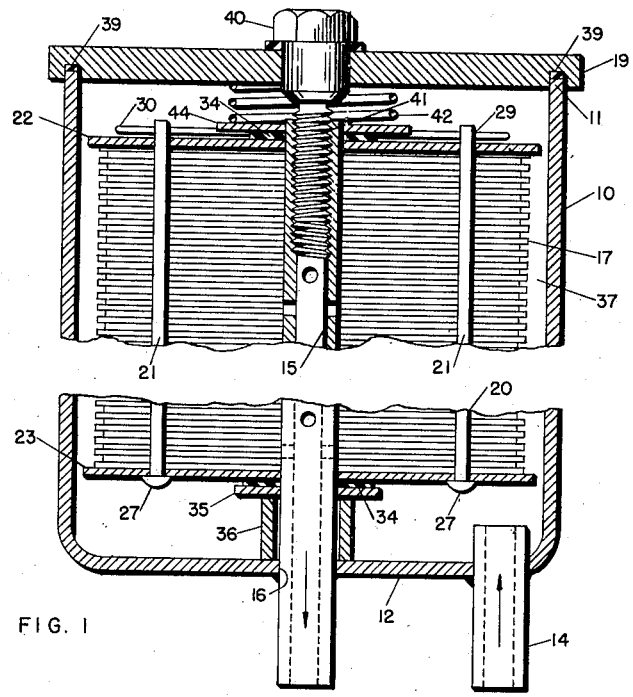
Figure 1 is a vertical sectional view taken axially through filter apparatus embodying a filter pack in accordance with the present invention.

Referring to the drawings, and more particularly to Figure 1, there is shown filter apparatus comprising a cylindrical casing or housing 10 of any desired height having an open upper end 11 and a closed lower end 12 provided with a fluid inlet 14; a perforated tube 15 serving as a fluid outlet extending through a central aperture 16 in the lower end of the casing to the upper end thereof and being welded or otherwise secured to the casing; a filter pack 17 mounted on the tube 15; and a cover 19 for the open end of the casing.

Figure 2:
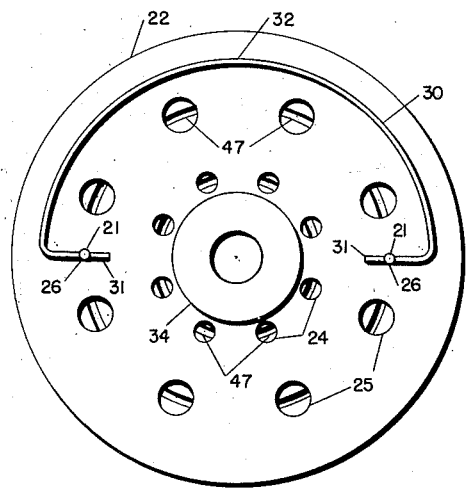
Figure 2 is a plan view of the top of the filter pack.

The filter pack comprises a plurality of filter discs each having a pair of apertures 20 arranged to provide a pair of openings extending through the filter pack adapted to receive rods 21. The discs are preferably retained between upper and lower end plates 22 and 23, each having circular concentric inner and outer zones of apertures 24 and 25 (Figure 2), the function of which will be described hereinafter, and each having a pair of apertures 26 for receiving the rods 21. The lower end of each rod has an enlargement or head 27 for supporting the lower end plate 23 and the upper end of each rod has a transverse bore 29 or the like extending outwardly of the pack. A bail wire 30 (Figure 2) has radially inwardly extending end portions 31 which pass through the bores 29 of the rods, respectively, to retain the upper end plate against displacement from the rod, and has a semi-circular intermediate portion 32 serving as a handle to facilitate handling the pack and placing it into and removing the same from the casing 10.

In order to mount the filter pack in the casing the filter discs and end plates have central apertures for receiving the tube 15. The upper and lower end plates 22 and 23 have an annular gasket 34 at the end surfaces for forming a seal between the central apertures of the end plates and the tube. The gasket 34 adjacent the lower end plate is seated on a washer 35 which is supported by a sleeve 36 surrounding the tube and in turn supported on the bottom or closed lower end of the casing to space the lower end of the filter pack therefrom. The dimensions of the filter pack and casing preferably are such that a space 37 is provided between the periphery of the filter pack and the inner side wall of the casing for receiving the liquid to be filtered.

The cover 19 carries a sealing gasket 39 for engaging the upper edge of the casing and has a central aperture for receiving a bolt member 40 having a threaded shank 41 adapted to be removably threaded into the upper end of the tube 15. In order to hold the filter pack on its support and to apply pressure to the filter discs, a spring 42, surrounding the shank of the bolt member 43, is placed between the underside of the cover 19 and a washer 44 surrounding the tube 15 and seated on the gasket 34 above the upper end plate 22.

Figure 3A:
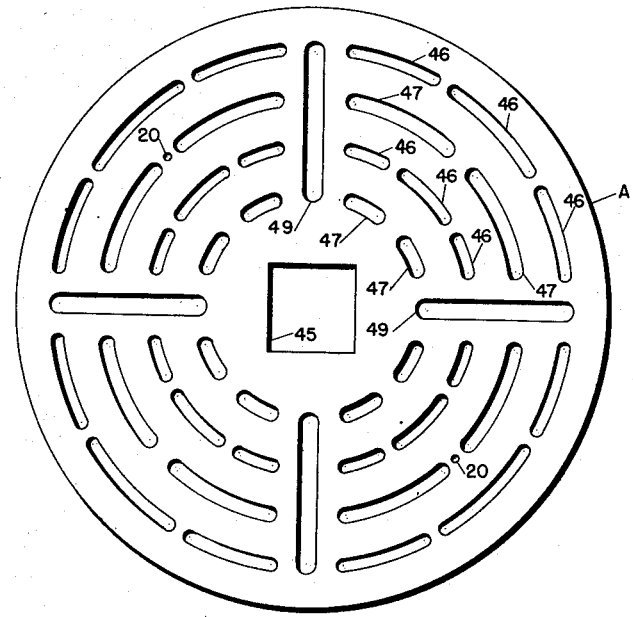
Figures 3a and 3b are plan views of two forms of filter discs utilized in the pack.
Figure 3B:
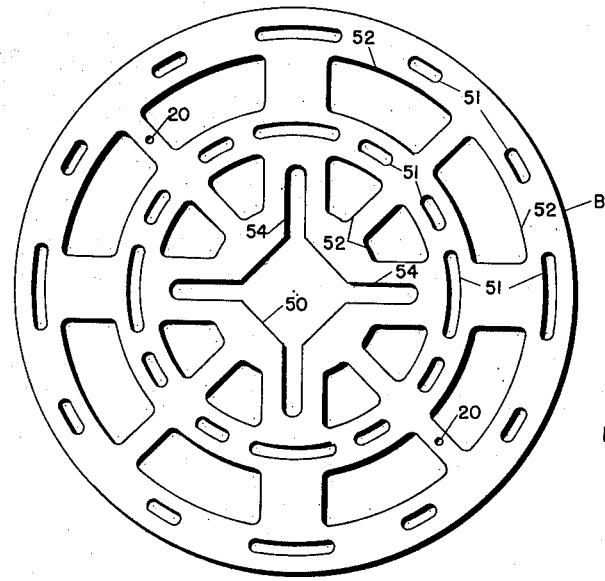
Figure 4:
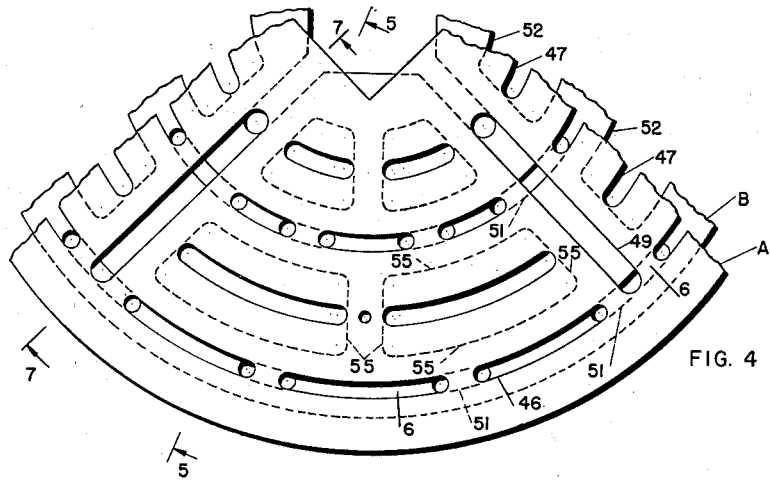
Figure 4 is an enlarged fragmentary plan view of a filter element of one type superimposed on a filter element of another type illustrating the courses taken by the medium to be filtered.
Figure 5:
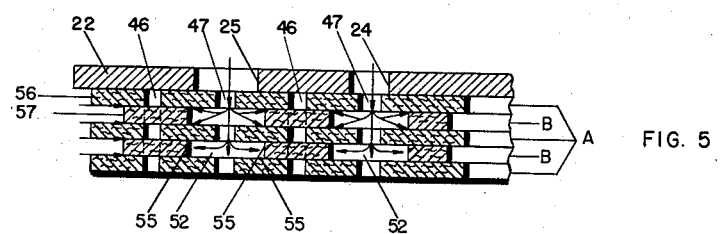
Figure 5 is a sectional view taken substantially along the line 5—5 on Figure 4.
Figure 6:
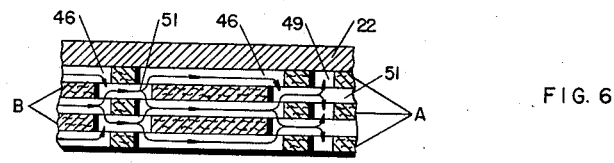
Figure 6 is a sectional view taken substantially along the line 6—6 on Figure 4.
Figure 7:
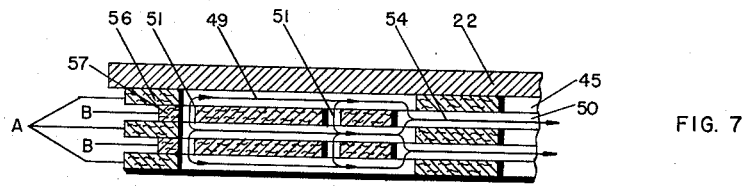
Figure 7 is a sectional view taken substantially along the line 7—7 on Figure 4.

As illustrated more particularly in Figures 3 to 7 of the drawings, the filter pack 17 comprises two forms of filter discs A and B alternately arranged in superimposed relation with the discs of the same form being in alignment with each other (Figures 5 to 7). In Figure 4, a disc A is superimposed on a disc B, the disc A being shown in continuous lines and the disc B being shown in broken lines.

Generally described, the discs are formed of pulp board and have central apertures for receiving the tube 15, circumferentially extending cooperating slots between the central apertures and the outer peripheries of the discs constructed and arranged to provide filter edges for the entrance of liquid to be filtered, circumferentially extending cooperating slots constructed and arranged to provide passages for receiving liquid having passed between the filter edges, and radially extending slots constructed and arranged to provide a passage in fluid flow communication with the first mentioned passage for conducting liquid from the first passage to the central apertures serving as outlets for the filtered liquid.

More particularly described with reference to Figure 3, the discs of the form A comprise a central aperture 45, a plurality of circular zones of circumferentially spaced slots 46, a plurality of circular zones of circumferentially spaced slots 47 alternately arranged in a radial direction with the slots 46, and a plurality of radially extending circumferentially spaced slots 49.

The discs of the form B comprise a central aperture 50, a plurality of circular zones of circumferentially spaced slots 51, a plurality of circular zones of circumferentially spaced openings 52 alternately arranged in a radial direction with the slots 51, and a plurality of circumferentially spaced recesses 54 extending radially outwardly from the central aperture 50.

As illustrated in Figures 4 to 7, the discs A and B are so constructed that when they are arranged in their intended superimposed position the slots 47 overlie the openings 52 to provide cooperating filter edges at 55 (Figures 4 and 5); the slots 46 partially overlie the slots 51 to provide continuous circular passages (Figure 6); and the radially extending slots 49 extend across the slots 51 to provide radial passages (Figure 7) in communication with the circular passages and overlie a portion of the recesses 54 to provide continuous radial passage extending from the outermost circular passage to the central apertures. The peripheral portions 56 of the discs A and the peripheral edges 57 of the discs B also cooperate to provide filter edges (Figures 4, 5 and 7).

In operation, the liquid to be filtered enters the casing 10 by way of the inlet 14 and, when the casing is substantially filled, surrounds the filter pack 15. The liquid enters the apertures 24 and 25 of the end plates and flows into slots 47 and openings 52 of the discs A and B, respectively. The liquid so admitted is adapted to pass between the filter edges at 55 (Figures 4 and 5) into the circular passages provided by the slots 46 and 51 and directly into the radial passages provided by the slot 49. The liquid in the circular passages flows into the radial passages from where it is conducted to the central aperture (Figures 6 and 7). The liquid delivered to the central apertures enters the openings of the perforated tube 15 and is discharged therethrough from the casing as filtered liquid.

The liquid entering between the portions 56 and the edges 57 flows into the outermost circular passage and is conducted to the radial passages through which it is conducted to the central apertures.

The arrows applied to Figures 4 to 7 indicate the path and directions of flow of the liquid being filtered.

While the filter pack has been illustrated and described as comprising alternate A and B discs, it will be apparent and it is contemplated that one or more discs A or B may be alternately arranged adjacent each other in superimposed aligned relation.

From the foregoing description it will be seen that the present invention provides an improved filter pack which is readily handled as a unit and has a maximum filter edge length for the surface area of the discs whereby liquids may be filtered rapidly in an effective manner.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A filter pack comprising two forms of filter discs alternately arranged in superimposed relation with the discs of the same form being in alignment with each other, the discs of both forms having a central aperture; one form of discs having a plurality of circumferentially spaced recesses extending radially outwardly from its said central aperture, having a circular zone of openings, and having a circular zone of slots intermediate said zone of openings and the central aperture of said disc; and the other form of discs having a plurality of circumferentially spaced radially extending slots overlying a portion of said recesses and extending across said circular zone of slots of said first described form of discs, having a circular zone of slots at least partially overlying the slots of said circular zone of slots of said first described form of discs, and having a circular zone of slots overlying said zone of openings of said first described form of discs.

2. A filter pack comprising two forms of filter discs alternately arranged in superimposed relation with the discs of the same form being in alignment with each other, the discs of both forms having a central aperture; one form of discs having a plurality of circumferentially spaced recesses extending radially outwardly from its said central aperture, having two concentric zones of openings, and having a circular zone of slots intermediate said zones of openings; and the other form of discs having a plurality of circumferentially spaced radially extending slots overlying a portion of said recesses and extending across said circular zone of slots of said first described form of discs, having a circular zone of slots at least partially overlying the slots of said circular zone of slots of said first described form of discs, and having two concentric zones of slots overlying said two concentric zones of openings, respectively, of said first described form of discs.

3. A filter pack comprising two forms of filter discs alternately arranged in superimposed relation with the discs of the same form being in alignment with each other, the discs of both forms having a central aperture; one form of discs having a plurality of circumferentially spaced recesses extending radially outwardly from its said central aperture, having two concentric zones of slots, and having a circular zone of openings intermediate said zones of slots; and the other form of discs having a plurality of circumferentially spaced radially extending slots overlying a portion of said recesses and extending across said zones of slots of said first described form of discs, having two concentric zones of slots at least partially overlying the slots of said concentric zones of slots of said first described form of discs, and having a circular zone of slots overlying said circular zone of openings of said first described form of discs.

4. A filter pack comprising two forms of filter discs alternately arranged in superimposed relation with the discs of the same form being in alignment with each other, the discs of both forms having a central aperture; one form of discs having a plurality of circumferentially spaced recesses extending radially outwardly from its said central aperture, having two concentric zones of openings, having a circular zone of slots intermediate said zones of openings, and having a second circular zone of slots intermediate the outer of said zones of openings and the periphery of said disc; and the other form of discs having a plurality of circumferentially spaced radially extending slots overlying a portion of said recesses and extending across said circular zones of slots of said first described form of discs, having two concentric zones of slots at least partially overlying the slots of said circular zones of slots, respectively, of said first described form of discs, and having two concentric zones of slots overlying said two concentric zones of openings, respectively, of said first described form of discs.

5. A filter pack comprising two forms of filter discs alternately arranged in superimposed relation with the discs of the same form being in alignment with each other, the discs of both forms having a central aperture; one form of discs having a plurality of circumferentially spaced recesses extending radially outwardly from its said central aperture, having a circular zone of openings, and having a circular zone of slots intermediate said zone of openings and the central aperture of said disc; the other form of discs having a plurality of circumferentially spaced radially extending slots overlying a portion of said recesses and extending across said circular zone of slots of said first described form of discs, having a circular zone of slots at least partially overlying the slots of said circular zone of slots of said first described form of discs, and having a circular zone of slots overlying said zone of openings of said first described form of discs; and end plates having circular zone of aperture overlying said circular zone of slots of said second described form of discs.

6. A filter pack comprising two forms of filter discs alternately arranged in superimposed relation with the discs of the same form being in alignment with each other, the discs of both forms having a central aperture; one form of discs having a plurality of circumferentially spaced recesses extending radially outwardly from its said central aperture, having two concentric zones of openings, a circular zone of slots intermediate said zones of openings, and having a second circular zone of slots intermediate the outer of said zones of openings and the periphery of said disc; the other form of discs having a plurality of circumferentially spaced radially extending slots overlying a portion of said recesses and extending across said circular zones of slots of said first described form of discs, having two concentric zones of slots at least partially overlying the slots of said circular zones of slots, respectively, of said first described form of discs, and having two concentric zones of slots overlying said two concentric zones of openings, respectively, of said first described form of discs; and end plates having two concentric zones of apertures overlying said two concentric zones of slots, respectively, of said second described form of discs.

7. A filter pack comprising two forms of filter discs alternately arranged in superimposed relation with the discs of the same form being in alignment with each other, the discs of both forms having a central aperture; one form of discs having a circular zone of openings, and having a circular zone of circumferentially extending slots; and the other form of discs having a circular zone of circumferentially extending slots the ends of which each overlie the end of a slot of said circular zone of slots of said first described form of discs to provide a continuous annular passage, and having a circular zone of slots overlying said zone of openings of said first described form of discs, one form of discs having a plurality of circumferentially spaced recesses extending radially outwardly from its said central aperture and the other form of discs having a plurality of circumferentially spaced radially extending slots extending across certain of said circumferentially extending slots with the inner ends overlying the outer ends of said radially extending recesses to provide radial passages extending from the annular passage to said central apertures.

8. A filter pack comprising two forms of filter discs alternately arranged in superimposed relation with the discs of the same form being in alignment with each other, the discs of both forms having a central aperture; one form of discs having a plurality of circumferentially spaced recesses extending radially outwardly from its said central aperture, having a circular zone of slots, and having a circular zone of openings intermediate said zone of slots and the central aperture of said disc; and the other form of discs having a plurality of circumferentially spaced radially extending slots overlying a portion of said recesses and extending across said circular zone of slots of said first described form of discs, having a circular zone of slots at least partially overlying the slots of said circular zone of slots of said first described form of discs, and having a circular zone of slots overlying said zone of openings of said first described form of discs.

CLARENCE T. PAMP, Jr.

REFERENCES CITED

The following references are of record in the file of this patent:

UNITED STATES PATENTS

| Number | Name | Date |
| --- | --- | --- |
| 664,572 | McDougall | Dec. 25, 1900 |
| 1,793,583 | Bowden | Feb. 24, 1931 |
| 1,849,582 | Lundborg | Mar. 15, 1932 |
| 2,365,525 | Cox | Dec. 19, 1944 |
| 2,455,486 | Hicks | Dec. 7, 1948 |
| 2,522,502 | Clark | Sept. 19, 1950 |